Patented Oct. 12, 1954

2,691,664

UNITED STATES PATENT OFFICE 2,691,664

MONOGLYCERIDE SYNTHESIS

Karl F. Mattil, Chicago, and Rex J. Sims, Evanston, Ill., assignors to Swift & Company, Chicago, Ill., a corporation of Illinois No Drawing. Application February 15, 1951,
Serial No. 211,181

12 Claims. (Cl. 260—410.7)

1

The present invention relates to the preparation of a mixture of glycerides having a high monoglyceride content by the direct reaction of natural or hydrogenated fats with excess glycerol. More particularly, this invention relates to a new method for interesterification in homogeneous solution whereby the production of monoglycerides is promoted.

When glycerol is reacted with a triglyceride, the product will consist of a mixture of mono-, di-, and triglycerides and unreacted glycerol. The proportion of monoglycerides that it is possible to obtain by the reaction of glycerol with triglycerides depends upon the proportion of reactants that it is possible to maintain in homogeneous solution. Present commercial methods result in monoglyceride yields of less than 50 per cent due to the limited solubility of glycerol in triglycerides. Attempts have been made in the past to find methods for increasing this solubility and, thus, to increase the monoglyceride yield. Interesterification catalysts having an alkaline nature have been proposed and have, in part, succeeded in increasing the monoglyceride yield. Another suggested solution was to find a solvent in which both reactants were soluble. Phenol has been proposed as such a solvent, but has not proven satisfactory in practice. It has been found to act not only as a solvent, but also to enter into the reaction to an undetermined extent, thus making it difficultly removable from the reaction mixture.

It is, therefore, an object of the present invention to provide an improved method for the production of high monoglyceride-content mixtures from triglycerides and glycerol.

Another object is to provide a method for the production of high monoglyceride-content mixtures wherein the reaction takes place in homogeneous solution.

A further object is to provide specific solvent mediums in which the triglycerides, glycerol and resulting mixed glycerides are completely miscible.

Additional objects, if not specifically set forth herein will be readily apparent to one skilled in the art from the following detailed description of the invention:

The present invention comprises generally the reaction of glycerol with a triglyceride fat in homogeneous solution in the presence of an interesterification catalyst to form mixtures containing a high proportion (above 40-50 per cent) of monoglycerides.

More particularly, it has now been found that

2 tertiary aromatic nitrogenous bases, under certain conditions, will simultaneously dissolve both glycerol and triglycerides. When these reactants are present within certain proportions by weight, and in contact with a suitable catalyst under these conditions, the resulting reaction produces a mixture rich in monoglycerides.

Examples of tertiary aromatic nitrogenous bases which may be used as solvents in the present invention are pyridine, quinoline and gamma-picoline. Additional solvents are the lutidines, collidines, isoquinoline, the alpha- and beta-picolines and mixtures of these with gamma-picoline. While it is preferable to use these solvents singly, it is considered within the scope of the present invention to employ mixtures of two or more of these solvents if desired.

Although these solvents will dissolve both glycerol and triglycerides separately when cold, they will not dissolve them simultaneously. Thus, either glycerol or triglycerides are soluble in cold pyridine, but when a solution of glycerol in cold pyridine is added to even a small amount of fat, the glycerol is thrown out of solution. It is only under the conditions specified herein that these solvents will dissolve both reactants simultaneously. All solvents in which triglycerides and glycerol are soluble separately will not accomplish the simultaneous solution of these reactants and hence are not operable as solvents for the present invention. Examples of such solvents are dioxane, acetone, methanol, ethanol, and chloroform.

The catalyst may be any suitable interesterification catalyst. Sodium methoxide is preferred, but the methoxides of other alkali metals, such as potassium and lithium, may also be used as well as monosodium propylene glycolate and monopotassium glycerate.

In practice, sufficient solvent must be employed to effect complete miscibility of the reactants in order to obtain a high percentage of monoglycerides in the product. The solvent-fat (by the term "fat" as used herein is meant triglyceride fat) ratio should be from about 3:1 to 8:1 by weight, and preferably above 4:1. The solvent should be present in from 2 to 4 times as great an amount by weight as the glycerol. The catalyst should be present in amounts in excess of 0.3 per cent by weight based on the fat present, and may range up to 4 per cent or higher if desired. The glycerol-fat ratio must be greater than 0.5:1 in order to obtain a monoglyceride yield of above 60 per cent in the product.

The glycerol and triglyceride reactants, admixed with the solvent and catalyst in the proportions indicated above, when heated to temperatures within the range of 30° C. to 130° C., form a homogeneous solution and will react to produce a product rich in monoglyceride content. The optimum temperature range for the reaction is from about 80° C. to about 100° C. At lower temperatures, i. e. around 30° C., it takes several days for the reactants to form the desired homogeneous solution, and additionally requires a considerable amount of agitation to accomplish complete solubility. When the solvent-fat weight ratio is 4:1 or higher, the time required for reaction is only that required to heat the reactants to the range 80° C.-100° C. In this range the mixture usually becomes homogeneous, and isolation of the product can be carried out immediately. When the solvent-fat weight ratio is cut below 4:1, the maximum percentages of monoglycerides are not reached until heating has been continued for about one hour. Consistent yields of monoglyceride contents of 60 per cent to 78 per cent are obtained by the present method. The products can be deodorized without deterioration, and in fact, the percentage of monoglycerides usually increases slightly during a short deodorization at 400° F. due to removal of free glycerol.

The reaction products can be crystallized from solution after inactivating the catalyst by the addition of excess dilute mineral acid. The most satisfactory acid has been found to be hydrochloric acid. Glacial acetic or 75 per cent phosphoric acid do not appear to neutralize the catalyst completely. If just sufficient acid is added to neutralize the catalyst, the excess solvent, e. g. pyridine, can be distilled from the product and reused without drying. The excess glycerol then separates and may also be reused without drying. When excess acid is used, the recovered solvent and glycerol cannot be reused, but as a compensating factor, the monoglyceride content is slightly higher.

The following examples are set forth for the purpose of illustration only, and are not to be construed as limitations on the scope of the instant invention:

*Example I*

| | Weight Ratio | | Catalyst (percent by wt. of fat) | Reaction | | Separation | Yield, per cent |
|---|---|---|---|---|---|---|---|
| | Glycerol per 1 part fat | Solvent per 1 part fat | | Temperature, °C. | Time | | |
| A | 1 | 5 | 2 | 80 | 5 minutes | Washed while hot with excess dilute HCl; washed with hot salt water; dried at 100° C. and 30 mm. pressure. | 77.0 |
| B | 2 | 6 | 4 | 90 | do | Neutralized catalyst with 75% H$_3$PO$_4$; stirred 1½ hours at 90° C.; distilled solvent at 30 mm.; separated glycerol. | 62.5 |
| C | 4 | 8 | 4 | 90 | do | Washed while hot with excess dilute HCl; washed with salt water; dried at 100° C. and 30 mm. pressure. | 77.5 |
| D | 0.5 | 2 | 2 | 80 | do | (same as C. above) | 60.0 |
| E | 1 | 4 | 1 | 90 | do | Washed with 10-1 excess of concentrated HCl to neutralize catalyst; distilled solvent at 30 mm.; separated glycerol; washed and dried product. | 76.4 |
| F | 1 | 3 | 0.3 | 120 | 30 minutes | Added just enough concentrated HCl to neutralize catalyst; distilled solvent and separated glycerol. | 49.6 |
| | | | | | | The product of sample F deodorized 15 minutes at 200° C. | 54.6 |
| G | 1 | 3 | 1 | 120 | 1 hour | (Same as E. above) | 78.0 |

(Example I illustrates a number of tests conducted with varying weight ratios of glycerol, solvent and catalyst within the temperature range of the present invention. In all of these tests the solvent used was pyridine, and the fat was 60 titer soybean flakes. The catalyst used in the tests was sodium methoxide.)

*Example II*

A mixture was prepared of 4 parts by weight of gamma-picoline, 4 parts by weight of sodium methoxide catalyst, 1 part by weight of glycerol, and 1 part by weight of 60 titer soybean flakes. This mixture was then heated to 85° C. for a period of 5 minutes and the resulting product washed with hot dilute HCl, washed again with salt water and dried at 100° C. and 1 mm. pressures. The yield of monoglyceride was 63.6 per cent.

*Example III*

A mixture of 5 parts quinoline, 4 parts sodium methoxide catalyst, 1 part of glycerol and 1 part of 60 titer soybean flakes was prepared and heated to 120° C. for 5 minutes. A separation or isolation treatment as used in Example II was applied and the monoglyceride yield was found to be 68.4 per cent.

*Example IV*

One part oleo oil, 2 parts glycerol, 4 parts pyridine, and 1 per cent sodium methoxide catalyst were heated rapidly to 100° C. at which point the mixture became homogeneous. The catalyst was quenched immediately with dilute hydrochloric acid and the pyridine removed by washing with salt water. The product contained 71.7 per cent monoglyceride.

*Example V*

One part 60 titer hydrogenated lard, 2.2 parts glycerol, 6 parts pyridine and 1 per cent sodium methoxide catalyst were held at 70° C. overnight. The mixture appeared homogeneous in the first half-hour, but the longer time was used to assure equilibrium. The product contained 76.9 per cent monoglyceride.

*Example VI*

One part oleo oil, 2 parts glycerol, 7 parts pyridine and 1 per cent sodium methoxide catalyst were shaken together intermittently at room temperature. After about 3 hours, the reaction mixture became homogeneous. The catalyst was quenched with acetic acid and the pyridine removed by salt water washing. The product was found to contain 70.2 per cent monoglyceride.

*Example VII*

As mentioned above, the sodium methoxide catalyst may be replaced by other suitable interesterification catalysts. For example, from 25 grams of hard fat, 100 grams of glycerol, 300 grams of pyridine and 1 gram of monosodium propylene glycolate, reacted under conditions of this invention, a product was obtained containing 55.7 per cent monoglycerides. Using the same proportions of reactants, but substituting 1 gram of monopotassium glycerate for the monosodium propylene glycolate catalyst, a product containing 49.6 per cent monoglycerides was obtained.

Example VIII

As an illustration of the fact that all solvents which will dissolve both fat and glycerin separately are not suitable in the present method, a comparison test was run using dioxane and pyridine as solvents.

Using dioxane as solvent, a mixture of 50 grams oleo oil, 50 grams of glycerol, 100 ml. of dioxane and 0.5 gram of sodium methoxide was heated at the boiling point of the mixture for several hours. At the end of this time the mixture was not homogeneous and the per cent monoglyceride recovery was only 16½ per cent.

Using pyridine as solvent, a mixture of 50 grams oleo oil, 50 grams of glycerol, 100 ml. of pyridine and 0.3 gram of sodium methoxide became homogeneous after only 30 minutes of heating. The recovery of monoglyceride in this case was 76.3 per cent. Interfacial tension measurements were made on this product using a Du Nouy Tensiometer. The product was dissolved in mineral oil and the interfacial tensions between the solutions and water were measured. Mineral oil against water had an interfacial tension of 26 dynes per centimeter. A solution of 0.01 per cent of the product in mineral oil against water was only 14.8 dynes per centimeter. When 0.1 per cent of the product in mineral oil was measured against water, interfacial tension was only 2.3 dynes per centimeter.

As may be seen from the foregoing examples, reaction times are short when using this method, ranging around 5 minutes for the optimum temperatures and mixtures disclosed. The production of high monoglyceride-content mixtures is consistently achieved by following the method of this invention.

The term "fat" as used herein is intended to include all triglyceride fats either natural or hydrogenated including animal, vegetable and marine fats, as for example lard, oleo oil, coconut oil, tallow, sperm oil, olive oil, and the like.

Obviously, many modifications and variations of the invention hereinbefore set forth may be made without distinguishing from the spirit and scope thereof, and therefore only such limitations should be imposed as are indicated in the appended claims.

We claim:

1. A method for the preparation of mixtures of glycerides having high monoglyceride contents, which comprises: reacting triglyceride fat with glycerol in homogeneous solution in a tertiary aromatic nitrogenous base solvent; and maintaining the reactants and the products of the reaction in solution until the conversion of the triglycerides to monoglycerides is substantially complete.

2. A method for the preparation of mixtures of glycerides having high monoglyceride contents, which comprises: simultaneously dissolving glycerol and triglyceride fat in a tertiary aromatic nitrogenous base solvent to form a homogeneous solution; reacting said dissolved glycerol and fat in said homogeneous solution in the presence of an alkaline interesterification catalyst; and recovering the resulting mixed glyceride product from said solution after the conversion of triglycerides to monoglycerides is substantially complete.

3. A method for the preparation of mixtures of glycerides having high monoglyceride contents, which comprises: reacting triglyceride fat with glycerol at elevated temperatures in the presence of a mutual tertiary aromatic nitrogenous base solvent for the fat and glycerol; and maintaining the reactants and the products of the reaction in solution until the conversion of triglycerides to monoglycerides is substantially complete.

4. A method for the preparation of mixtures of glycerides having high monoglyceride contents, which comprises: simultaneously dissolving triglyceride fat and glycerol in a tertiary aromatic nitrogenous base solvent to form a homogeneous solution; reacting said dissolved fat and glycerol in said homogeneous solution at temperatures within the range 30° C. to 130° C. in the presence of a small amount of an alkaline interesterification catalyst; and maintaining the reactants and products of the reaction in solution until the conversion of triglycerides to monoglycerides is substantially complete.

5. A method as in claim 4 wherein the temperature is in the range 80° to 100° C.

6. A method for the production of mixtures of glycerides having high monoglyceride contents, which comprises: forming a homogeneous solution of glycerol and triglyceride fat in a tertiary aromatic nitrogenous base solvent medium, said solvent medium being present in sufficient quantity to hold the reactants and products of reaction in solution; adding thereto a small amount of an alkaline interesterification catalyst; reacting said glycerol and said fat in homogeneous solution at temperatures within the range 30° C. to 130° C. to form mixed glycerides predominating in monoglycerides which remain in solution adding sufficient dilute mineral acid to said solution to neutralize said catalyst; and then removing the solvent and excess glycerol from the mixed glyceride product.

7. A method as in claim 6 wherein the solvent medium is pyridine.

8. A method as in claim 6 wherein the solvent medium is gamma-picoline.

9. A method as in claim 6 wherein the solvent medium is quinoline.

10. A method for the preparation of mixtures of glycerides having high monoglyceride contents, which comprises: adding glycerol, triglyceride fat and an alkaline interesterification catalyst to a tertiary aromatic nitrogenous base solvent medium, the ratio by weight of glycerol to fat being at least 0.5:1; heating said mixture until it becomes homogeneous and interesterification takes place, the resulting interesterification products remaining in solution; neutralizing said catalyst; and then removing the solvent and excess glycerol from the interesterification products.

11. A method as in claim 10 wherein the mixture is heated to a temperature within the range 80° to 100° C.

12. A method as in claim 10 wherein the catalyst is sodium methoxide.

References Cited in the file of this patent

UNITED STATES PATENTS

| Number | Name | Date |
|--------|------|------|
| 2,442,534 | Eckey | June 1, 1948 |
| 2,553,288 | Young et al. | May 15, 1951 |